United States Patent
Wombacher et al.

(10) Patent No.: US 6,398,866 B1
(45) Date of Patent: Jun. 4, 2002

(54) METHOD FOR THE REDUCTION OF THE DEGREE OF SHRINKAGE OF HYDRAULIC BINDERS

(75) Inventors: Franz Wombacher, Oberlunkhofen; Theodor A. Bürge, Geroldswil; Urs Mäder, Frauenfeld, all of (CH)

(73) Assignee: Sika AG, vorm. Kaspar Winkler & Co., Zurich (CH)

( * ) Notice: Subject to any disclaimer, the term of this patent is extended or adjusted under 35 U.S.C. 154(b) by 0 days.

(21) Appl. No.: 09/493,266

(22) Filed: Jan. 28, 2000

(30) Foreign Application Priority Data

Jan. 29, 1999 (CH) ............................................... 0165/99

(51) Int. Cl.$^7$ .......................... C04B 40/00; C04B 24/12; B01F 3/12; C09K 3/00
(52) U.S. Cl. .......................... 106/823; 106/727; 252/1; 252/194; 516/67
(58) Field of Search .................. 252/1, 194; 106/727, 106/823; 516/67

(56) References Cited

U.S. PATENT DOCUMENTS

| | | | | |
|---|---|---|---|---|
| 1,930,845 A | * | 10/1933 | Ulrich et al. ................. 516/67 |
| 2,334,517 A | * | 11/1943 | Tucker ..................... 516/67 X |
| 2,359,066 A | * | 9/1944 | Wampner .................... 516/67 |
| 2,794,516 A | * | 6/1957 | Baggett ..................... 252/1 X |
| 3,583,880 A | | 6/1971 | Moren et al. ................ 427/314 |
| 4,428,855 A | * | 1/1984 | Law et al. ................ 516/67 X |
| 4,975,122 A | * | 12/1990 | Parkinson et al. ...... 106/823 X |
| 5,156,679 A | * | 10/1992 | Gartner et al. .......... 106/727 X |
| 5,389,143 A | | 2/1995 | Abdelrazig et al. ......... 106/696 |
| 5,571,319 A | * | 11/1996 | Berke et al. ............ 106/823 X |
| 5,603,760 A | | 2/1997 | Berke et al. ................ 106/802 |
| 5,622,558 A | | 4/1997 | Berke et al. ................ 106/802 |
| 5,660,626 A | * | 8/1997 | Ohta et al. ............ 106/823 X |
| 5,948,157 A | * | 9/1999 | McKenney et al. ..... 106/727 X |

FOREIGN PATENT DOCUMENTS

WO  WO96/27565  9/1996

* cited by examiner

*Primary Examiner*—Richard D. Lovering
(74) *Attorney, Agent, or Firm*—Burns, Doane, Swecker & Mathis, L.L.P.

(57) ABSTRACT

One object of the present invention is an agent for the reduction of the degree of shrinkage in hydraulic binders, whereby said agent comprises an alkanolamine of formula R—NH—(AOH) wherein R is hydrogen or a linear or branched aliphatic or cyclic $C_1$–$C_6$-alkyl group, and A is a $C_2H_4$-group or $C_3H_6$-group, alone or in combination with hydroxy compounds and/or ethers. Furthermore a method for the reduction of the dry shrinkage of binders such as cement, admixed cement, puzzolanas and thereof produced mortars and concretes by means of such a shrinkage reducing agent is described.

16 Claims, No Drawings

METHOD FOR THE REDUCTION OF THE DEGREE OF SHRINKAGE OF HYDRAULIC BINDERS

CROSS REFERENCE TO RELATED APPLICATIONS

This application claims the priority of Swiss Patent application 0165/99, filed Jan. 29, 1999, the disclosure of which is incorporated herein by reference in its entirety.

BACKGROUND OF THE INVENTION

The invention relates to an alkanolamine comprising agent for the reduction of the degree of shrinkage in hydraulic binders (shrinkage reducing agent), whereby said agent contains or consists of specific alkanolamines of formula R—NH—(AOH) alone or in combination with hydroxy compounds and/or ethers. Furthermore, a method for the reduction of the degree of dry shrinkage of binders such as cement, mixed cement, puzzolanes and thereof produced mortars and concretes by means of such a shrinkage reducing agent is described.

During the entire curing process, hydraulic binder systems pass through several steps. The first change in dimension prior to setting, comprising plastic shrinkage, can be compensated by the hardening composition and the therefrom resulting forces can be corrected. However, volume changes due to loss of water in the cured state can no longer be compensated by the system. Thus, such changes, in spite of their low magnitude, lead to the formation of cracks and deformations in said composition. Due to said cracks, the attack of the cement and/or—if present—steel reinforcements by damaging substances are facilitated and penetrating water can lead to the destruction of the structure due to freezing. All these problems lead to a significant reduction of the long time durability of a building due to said dry shrinkage.

Hitherto, already several substances are known that reduce the dry shrinkage of concrete. The most common of them are glycols and polyglycols as well as glycol ethers and polyglycol ethers. All of them are substances that can reduce the degree of shrinkage. Furthermore, types of substances exist that compensate the resulting volume reduction by expansion.

Substances falling under the second class are substances forming gases in an alkaline medium such as hydrazine compounds (nitrogen) or aluminum powder (hydrogen) as well as iron powder, the activity of which is based on a volume enhancement due to formation of iron oxide (rust). Furthermore, also calcium sulfoaluminates that are precursors of the voluminous ettringite and burned calcium oxide are used. All said substances are powders and thus suffer disadvantages in connection with their dosing. Furthermore high percentage of said substances must be added. Gas forming agents per se have the disadvantage that said gas can already be formed prior to the addition of concrete, and the generation of hydrogen in general is considered as very critical on a production site.

The cementituous precursors are very much dependent from the actual conditions, such as cement composition, temperature, environmental humidity and degree of hydration of the cement, and can lead to a spontaneous expansion in the cured state. The also promoted formation of ettringite can affect the durability of such a building.

In general it can be said that by said expansion effecting agents only a correction of the starting point of the thereon following dry shrinkage can be achieved. The magnitude of the degree of shrinkage as such remains the same and therewith deformations as mentioned above nevertheless can lead to damages.

Several substances comprising hydroxyl groups are already known as possible shrinkage reducing agents. For example lower alcohols are proposed (JP 1-129578/89) that, however, raise problems due to their low point of ignition.

Higher molecular systems, such as adducts of alcohol and alkylene oxide or adducts of alkylphenol and alkylene oxide (e.g. JP 37259/81 or 10947/87) have to be added in large amounts in order to achieve the desired result.

Also several small polyols have already been proposed. In 1987 Schulze mentioned terminal hydroxyl groups comprising compounds of the type $C_nH_{2n}(OH)_2$ as efficient (EP 0 308 950) and several Japanese published applications (e.g. 55-027819 or 06-072748) refer to similar types or special cases. Recently, in particular secondary and tertiary alkanediols were further investigated and found to be efficient.

Ether comprising diols have already generally been mentioned as shrinkage reducing agents by Goto in 1985 (U.S. Pat. No. 4,547,223). More specifically defined types have reached greater interest and are described as effective (WO 95/30630 and WO 96/27563 to Shawl as well as WO 96/27564, WO 96/27565 and U.S. Pat. No. 5,618,344 to Berke).

As further classes of substances water-soluble amino resins in combination with metal salts of fatty acids are mentioned by Okuno in 1989 (EP 0 359 068). In 1994 good results with amides, or generally formyl compounds, respectively, are reported by Abdelrazig in U.S. Pat. Nos. 5,326,396 and 5,326,397.

With regard to alkanolamines U.S. Pat. No. 3,583,880 teaches that the shrinkage of porous products can be reduced by the application of i.a. alkanolamines to already produced inorganic bodies. In 1995 Abdelrazig described (in U.S. Pat. No. 5,389,143) α,β-alkanolamines that on the one hand can effectively reduce the shrinkage that, however, on the other hand, are very expensive. The alkanolamines described by Abdelrazig show the following general formula

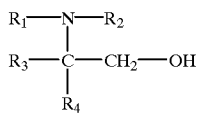

wherein $R_1$ and $R_2$ independently of each other represent hydrogen or a linear or a branched alkyl group. $R_3$ and $R_4$ can also independently from each other be hydrogen or a linear or a branched alkyl group with the proviso that $R_3$ and $R_4$ together have at least two carbon-atoms so that in particular $R_3$=H and $R_4$=H are excluded.

All the mentioned shrinkage reducing agents have one or more disadvantages. In view of their high dosage and/or their expensive production, they are uneconomical, due to their high surface activity, they destroy the effect of air entraining agents, due to their inflammability/point of ignition they cannot suitably be used at production sites, or they drasticly retard the development of strengths of cementituous systems.

BRIEF SUMMARY OF THE INVENTION

Hence it is a general object of the present invention to provide a shrinkage reducing agent as well as a method for the reduction of the degree of shrinkage of hydraulic binders, that avoids the above-mentioned disadvantages at least in part. It is in particular an object of the present invention to provide a shrinkage reducing agent that on the one hand is cheap, easily producible, allows unproblematic handling and furthermore develops a good shrinkage reducing effect. Furthermore, the shrinkage reducing agent should not affect the frost resistance of the resulting concrete in that, because of the addition of the shrinkage reducing agent, the amount of air present in the concrete is markedly reduced. A further object of the invention is to provide a method for the reduction of the degree of shrinkage of concrete that in particular is cheap and expedient. Said goals are achieved according to the independent claims. Preferred embodiments are mentioned in the dependent claims.

Now, in order to implement these and still further objects of the invention, which will become more readily apparent as the description proceedings, the agent for the reduction of the degree of shrinkage of hydraulic binders contains or consists of a) at least one alkanolamine of formula I

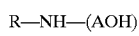

R—NH—(AOH)    I, wherein R is hydrogen or a linear or a branched aliphatic or cyclic $C_1$–$C_6$-alkyl group, and A is a $C_2H_4$- or $C_3H_6$-group, alone or in combination with b) at least one hydroxy compound and/or c) at least one ether compound.

Another aspect of the present invention is a method for the reduction of the degree of shrinkage of hydraulic binders such as cements according to Euronorm EN 197 in pure form or as admixture with latent hydraulic binders such as fly ash, blast furnace slag, burned oil shale, natural pozzolanas or silicafume or inert fillers such as stone powder, as well as thereof produced mortar or concrete, characterized in that a binder comprising mixture is additionally admixed with a shrinkage reducing agent according to the present invention.

DETAILED DESCRIPTION OF THE INVENTION

The inventive agent for the reduction of the degree of shrinkage (shrinkage reducing agent) of hydraulic binders contains or consists of a) at least one alkanolamine of formula I

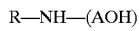

R—NH—(AOH)    I, wherein R is hydrogen or a linear or branched aliphatic or cyclic $C_1$–$C_6$-alkyl group, preferably $C_3$–$C_6$ alkyl group, and A is a $C_2H_4$- or $C_3H_6$-group, alone or in combination with b) at least one hydroxy compound and/or c) at least one ether compound.

In a preferred embodiment the shrinkage reducing agent contains or consists of a) about 1–100% by weight of at least one alka- nolamine of formula I as well as b) about 0–90% by weight of at least one hydroxy compound and/or c) about 0–90% by weight of at least one ether compound.

In an even more preferred embodiment, the shrinkage reducing agent contains or consists of a combination of a) about 5–40% by weight of at least one alkanolamine of formula I as well as b) about 0–90% by weight of at least one hydroxy compound and/or c) about 0–90% by weight of at least one ether compound, whereby the sum of b) and c) in a preferred embodiment is at least about 60% by weight.

In a most preferred embodiment, the shrinkage reducing agent contains or consists of a combination of a) about 10–40% by weight of at least one alkanolamine of formula I as well as b) about 0–90% by weight of at least one hydroxy compound and/or c) about 0–90% by weight of at least one ether compound, whereby the sum of b) and c) is at least about 60% by weight.

Particularly preferred alkanolamines are selected from the group comprising N-propylaminopropanol, N-butyl-aminopropanol, 2-(n-butylamino)-ethanol, 2-(t-butylamino)-ethanol, 2-(cyclohexylamino)-ethanol, 2-amino-1-propanol. Thereby, the alkanolamines can be present as such but also as salts of an organic or inorganic acid or as salts of a mixture of said acids or as a mixture of alkanolamines as such and at least one of their salts.

The alkanolamines used according to the present invention differ from those of Abdelrazig (U.S. Pat. No. 5,389,143) e.g. in the fact that besides of α,β-alkanolamines also α,γ-alkanolamines are applied, while with regard to the α,β-alkanolamines of formula I only those are applied wherein A is a $C_2H_4$ or a $C_3H_6$ group. This selective feature with regard to the alkanolamines has the great advantage that only cheap alkanolamines are applied whereby, against all expectations, surprisingly also with these comparatively simple alkanolamines of formula I alone or, in an even extended manner, in combination with the hydroxy compounds b) and/or the ethers c) an excellent shrinkage reducing effect can be achieved.

The hydroxy compounds comprised in one embodiment of the inventive shrinking reducing agent are preferably diols, in particular diols selected from the group comprising 2,2-dimethyl-1,3-pentanediol, 2,5-dimethyl-2,5-hexanediol, 2-ethyl-1,3-hexanediol, 1,6-hexanediol, 1,5-pentanediol, hexyleneglycol, polypropyleneglycol.

The ether compounds comprised in one embodiment of the inventive shrinkage reducing agent preferably are selected from the group comprising diethyleneglycol monobutylether, triethylenglycol monobutylether, triethyleneglycol monomethylether, dipropyleneglycol monobutylether, and ethoxylated neopentylglycol adduct.

The shrinkage reducing agent can be present as powder, or it can comprise water and/or a non-aqueous solvent thus that it is present as dispersion or emulsion or solution. For dispersions, emulsions and solutions it is preferred that the sum of a) and b) and c) is 50 to 80% by weight.

A further aspect of the present invention consists in a method for the reduction of the degree of shrinkage of hydraulic binders such as cements according to Euronorm EN 197 in pure form or as mixture with latent hydraulic binders or inert fillers as well as thereof produced mortar or concrete. According to the method of the present invention a shrinkage reducing agent is added to a mixture comprising the binder, which shrinking reducing agent contains or consists of a) at least one alkanolamine of formula I

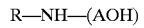

R—NH—(AOH)    I, wherein R is hydrogen or a linear or a branched aliphatic or cyclic $C_1$–$C_6$-alkyl group, preferably a C$_3$–C$_6$-alkyl group and wherein A is a C$_2$H$_4$-group or C$_3$H$_6$-group, alone or in combination with
b) at least one hydroxy compound and/or
c) at least one ether compound.

Latent hydraulic binders are e.g. fly ash, blast furnace slag, burned oil shale, natural pozzolanas or silica fume and inert fillers are e.g. stone powder.

In a preferred embodiment, the shrinkage reducing agent is added to the binder comprising mixture in an amount of 0,001–6,0% referred to the weight of the binder. Even more preferred is an amount of 1–3% by weight referred to the weight of the binder of the shrinkage reducing agent in the binder comprising mixture.

The shrinkage reducing agent can be applied as powder or dispersed or emulgated in water and/or in a non-aqueous solvent or dissolved in water and/or in a non-aqueous solvent. The shrinkage reducing agent can be applied premixed in one or more hydraulic binders or in dry mortar or in concrete. The admixture of shrinkage reducing agent to the binder mixture can be performed during the production of the binder in the factory either prior or during the grinding.

In a further preferred embodiment the shrinkage reducing agent can be added to the dry binder or to the water admixed binder, mortar or concrete in the factory, at the production site, in the mixing device, in the delivery pump or by means of a static mixing means with a powder dosing apparatus or a liquid dosing apparatus directly into the mixture.

A further aspect of the present invention is the use of an agent containing or consisting or
a) at least one alkanolamine of formula I

R—NH—(AOH)    I, wherein R is hydrogen or a linear or branched aliphatic or cyclic C$_1$–C$_6$-alkyl group, preferably a C$_3$–C$_6$-alkyl group, and A is a C$_2$H$_4$-group or a C$_3$H$_6$-group, alone or in combination with
b) at least one hydroxy compound and/or
c) at least one ether compound
for the reduction of the degree of shrinkage of hydraulic binders.

It was surprisingly found that with the abovementioned inventive shrinkage reducing agents the features related with the processing of concrete and mortar such as processability and strength, are not or only in a low degree influenced. Furthermore, in spite of the use of shrinkage reducing agents, it is possible to produce concrete that is made resistant to frost and defrosting salts by the incorporation of air pores by means of respective additives. A further advantage is the economy that is achieved by the application of low amounts as well as the easy availability of the substances of the present invention.

The shrinkage reducing additives of the present invention can be present and thus be applied as powder, dissolved in water or in combination with non-aqueous solvents and/or other concrete admixtures such as water reducers, high range water reducers, air entraining agents, corrosion inhibitors, silica slurries, dispersing agents etc. The admixture usually is performed in solid or dissolved form directly into the mixing water, to the cement, to the dry mixture or to the prepared concrete or mortar mixture.

In the following, the present invention is further explained by means of examples. Said examples are, however, by no means intended to in any way restrict the extent of the protection.

In the following examples the influence of alkanolamines alone or in combination with shrinkage reducing agents of the present invention is shown. As test mixtures for the performance of the examples mortars were selected that are intended to simulate concrete. The mixtures were composed as follows:

| | |
|---|---|
| Portland cement type CEM I 42.5 | 750,00 g |
| sand 0–8 mm | 3150,00 g |
| water | 352,50 g |
| high range water reducer on the basis of melamine | 7,50 g |
| shrinkage reducing agent | 11,25 g. |

Of this mixtures test bodies in prismatic form with the dimensions 4×4×16 cm with incorporated plug were produced and thereon the dimensional changes were measured according to a norm, namely DIN 52450. The test bodies were stored at 20° C. and 95% relative humidity for the first 24 hours and then at 23° C. and 50% relative humidity.

EXAMPLE 1

This example shows the effect of a shrinkage reducing agent on the basis of alkanolamine on the changes of length after 28 days.

| Additive | Change of length after 28 days |
|---|---|
| Reference (without shrinkage reducing agent) | −0,55 °/$_{oo}$ |
| Shrinkage reducing agent 1 (consisting of PROPA) | −0,31 °/$_{oo}$ |

PROPA = N-propylaminopropanol

This example shows that the application of 1,5% (w/w) of an alkanolamine, referred to the weight of the cement, reduces the dry shrinkage for 40%. The two following examples show the effect of alkanolamines in combination with diols or ethers, respectively.

EXAMPLE 2

| Additive | Change of length after 28 days |
|---|---|
| Reference (without shrinkage reducing agent) | −0,55 °/$_{oo}$ |
| Shrinkage reducing agent 2 (consisting of Ehdo) | −0,37 °/$_{oo}$ |
| Shrinkage reducing agent 3 (consisting of $^t$Buea) | −0,28 °/$_{oo}$ |
| Shrinkage reducing agent 4 ($^t$Buea/Ehdo 1:2) | −0,22 °/$_{oo}$ |

Ehdo = 2-ethyl-1,3-hexanediol
$^t$Buea = 2-(tert.-butylamino)-ethanol

EXAMPLE 3

| Additive | Change of length after 28 days |
|---|---|
| Reference (without shrinkage reducing agent) | −0,55 °/$_{oo}$ |
| Shrinkage reducing agent 5 (consisting of TEGBu) | −0,36 °/$_{oo}$ |
| Shrinkage reducing agent 6 (consisting of PROPA) | −0,30 °/$_{oo}$ |
| Shrinkage reducing agent 7 (PROPA/TEGBu 1:2) | −0,25 °/$_{oo}$ |

TEGBu = triethyleneglycol monobutylether
PROPA = N-propylaminopropanol

As can be seen from the above two examples, the shrinkage reducing influence of the single components surprisingly is significantly enhanced in a synergistic way by applying a combination of alkanolamines and diols and/or ethers.

EXAMPLE 4

| Additive | Change of length after 28 days |
|---|---|
| Reference (without shrinkage reducing agent) | −0,55 °/₀₀ |
| Shrinkage reducing agent 5 (consisting of TEGBu/Ehdo 1:1) | −0,35 °/₀₀ |
| Shrinkage reducing agent 6 (consisting of ᵗBuea) | −0,29 °/₀₀ |
| Shrinkage reducing agent 7 (ᵗBuea/TEGBu/Ehdo 1:1:1) | −0,24 °/₀₀ |

TEGBu = triethyleneglycol monobutylether
Ehdo = 2-ethyl-1,3-hexanediol
ᵗBuea = 2-(tert.-butylamino)-ethanol As can be seen from the three above shown examples, the shrinkage reducing influence of the single components surprisingly is significantly enhanced by the combination of alkanolamines and diols and/or ethers in a synergistic way.

EXAMPLE 5

The mixture used in this example is based on the above described mortar, however, additionally 6 g of a tall oil resin based air entraining agent (comprising about 5% of said air entraining agent) (i.e. 0,8 percent by weight referred to the cement weight) were added.

| Additive | Change of length after 28 days |
|---|---|
| Reference (without shrinkage reducing agent) | −0,55 °/₀₀ |
| Shrinkage reducing agent 2 (consisting of Ehdo) | −0,34 °/₀₀ |
| Shrinkage reducing agent 8 (consisting of 66% Ehdo and 10% nBuea + 24% H₂O) | −0,33 °/₀₀ |

Ehdo = 2-ethyl-1,3-hexanediol
nBuea = 2-(butylamino)-ethanol

Basically, no difference in the degree of shrinkage can be seen, however, the amount of substance in the combination of diol and alkanolamine is significantly smaller (shrinkage reducing agent 8 comprises 24% water), which is reflected by the air content that is essential for frost resistant concretes.

| Additive | Air content |
|---|---|
| Reference (without shrinkage reducing agent) | 8,5% |
| Shrinkage reducing agent 2 (consisting of Ehdo) | 2,1% |
| Shrinkage reducing agent 8 (consisting of 66% Ehdo and 10% nBuea + 24% water) | 5,8% |

As can be seen from the above results, by the combination of an alkanolamine with a diol, the loss of air content obtained with the diol alone, is reduced, without affecting the shrinkage behavior.

EXAMPLE 6

In this example it is shown that a shrinkage reducing agent of the present invention only minimally affects the strength development.

| Additive | Compressive strength | |
|---|---|---|
| | 1 day | 28 days |
| Reference (without shrinkage reducing agent) | 24 N/mm² | 49 N/mm² |
| Shrinkage reducing agent 2 (consisting of Ehdo) | 16 N/mm² | 45 N/mm² |
| Shrinkage reducing agent 8 (consisting of 66% Ehdo and 10% nBuea + 24% H₂O) | 21 N/mm² | 47 N/mm² |

Ehdo = 2-ethyl-1,3-hexanediol
nBuea = 2-(butylamino)-ethanol

While the application of a diol alone leads to a significant reduction in strength after one day, mortars produced with a shrinkage reducing agent of the present invention show an acceptable strength.

While there are shown and described presently preferred embodiments of the invention, it is to be distinctly understood that the invention is not limited thereto but may be otherwise variously embodied and practiced within the scope of the following claims.

What is claimed is:

1. An admixture for the reduction of the degree of shrinkage of hydraulic binders comprising
    a) about 5–40% by weight of at least one alkanolamine of formula I $$R-NH-(AOH) \tag{I}$$

wherein R is hydrogen or a linear or a branched aliphatic or cyclic $C_1$–$C_6$-alkyl group, and A is a $C_2H_4$- or $C_3H_6$-group,
    b) about 0–90% by weight of at least one hydroxy compound, and/or
    c) about 0–90% by weight of at least one ether compound; wherein the sum of b) and c) is at least about 60% by weight.

2. The shrinkage reducing admixture according to claim 1 comprising
    a) about 10–40% by weight of at least one alkanolamine of formula I,
    b) about 0–90% by weight of at least one hydroxy compound, and/or
    c) about 0–90% by weight of at least one ether compound; wherein the sum of b) and c) is at least about 60% by weight.

3. The shrinkage reducing admixture according to claim 1 wherein the alkanolamine is N-propylaminopropanol, N-butylaminopropanol, 2-(n-butylamino)-ethanol, 2-(t-butylamino)-ethanol, 2-(cyclohexylamino)-ethanol, 2-amino-1-propanol.

4. The shrinkage reducing admixture according to claim 1 wherein the alkanolamine is present as such or as salt of an organic or an inorganic acid or as a mixture of said forms.

5. The shrinkage reducing admixture according to claim 1 wherein the hydroxy compound is 2,2-dimethyl-1,3-pentanediol, 2,5-dimethyl-2,5-hexanediol, 2-ethyl-1,3-hexanediol, 1,6-hexanediol, 1,5-pentanediol, hexyleneglycol, or polypropyleneglycol.

6. The shrinkage reducing admixture according to claim 1 wherein the ether is diethylene glycol monobutylether, triethylene glycol monobutylether, triethylene glycol monomethylether, dipropylene glycol monobutylether, or neopentylglycol adduct.

7. The shrinkage reducing admixture according to claim 1 that comprises water or a non-aqueous solvent or a combination of water and a non-aqueous solvent, and that is a dispersion or an emulsion or a solution, and wherein the sum of the % by weight of the alkanolamine of formula I, the hydroxy compound and/or the ether compound is 50 to 80% by weight.

8. The shrinkage reducing admixture according to claim 1 wherein R in the alkanolamine of formula I is a linear or a branched aliphatic or cyclic $C_1$–$C_6$-alkyl group.

9. A method for the reduction of the degree of shrinkage of hydraulic binders in pure form or as admixture with latent hydraulic binders or inert fillers, as well as therof produced mortar or concrete, wherein a binder comprising mixture is additionally admixed with a shrinkage reducing admixture according to claim 1.

10. The method according to claim 9, wherein the hydraulic binders are cement, the latent hydraulic binders are fly ash, blast furnace slag, burned oil shale, natural pozzolanas, or silicafume and the inert fillers are stone powder.

11. The method according to claim 9, wherein the shrinkage reducing admixture is added in an amount of 0.001–6.0% by weight based on the weight of the binder.

12. The method according to claim 9, wherein the shrinkage reducing admixture is a powder, or a dispersion or an emulsion in water and/or in a non-aqueous solvent, or a solution in water and/or in a non-aqueous solvent.

13. The method according to claim 9, wherein the shrinkage reducing admixture is applied pre-mixed with at least one hydraulic binder or in dry mortar or concrete.

14. The method according to claim 9, wherein the shrinkage reducing admixture is admixed to the binder(s) during the production of the binder(s) in the factory either prior to or during the grinding.

15. The method according to claim 9, wherein the shrinkage reducing admixture is added to the dry binder or the water-admixed binder, mortar or concrete in the factory, at the building site, in the mixing apparatus, in the delivery pump, or by means of a static mixer with a powder dosing apparatus or a liquid dosing apparatus directly into the mixture.

16. The method according to claim 9, wherein the shrinkage reducing admixture is added in an amount of 1 to 3% by weight based on the weight of the binder.

* * * * *